Feb. 14, 1956 R. H. MERRITT 2,734,599
TORQUE ENGAGED BRAKE
Filed Oct. 20, 1952
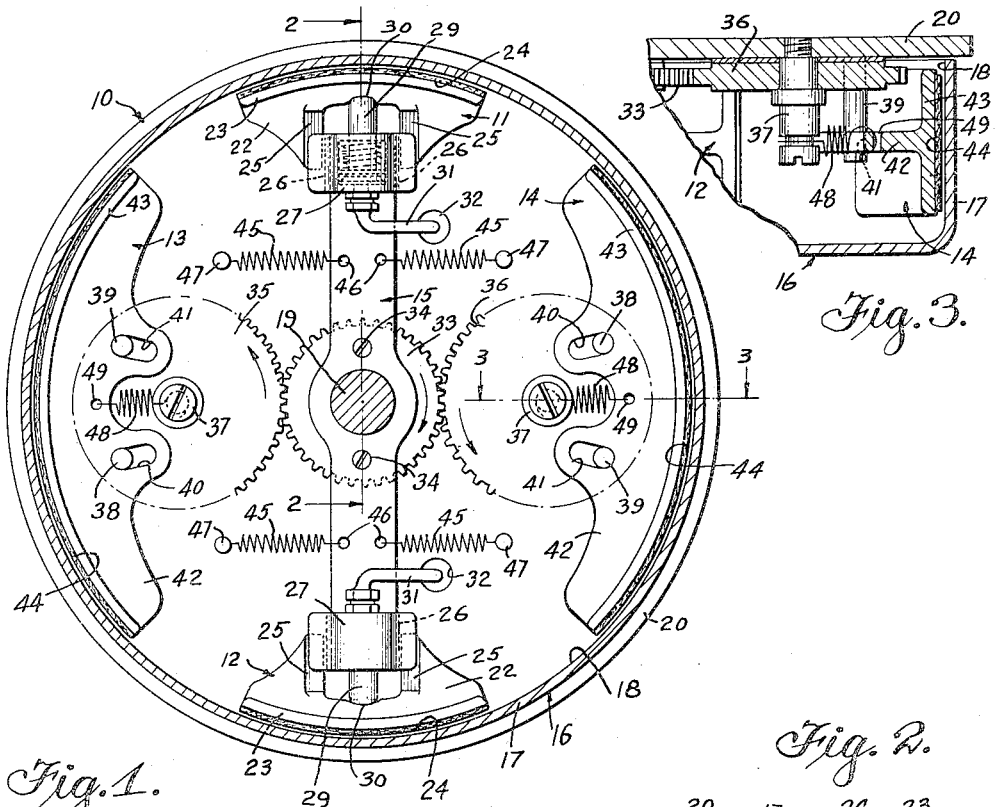
Fig. 1.
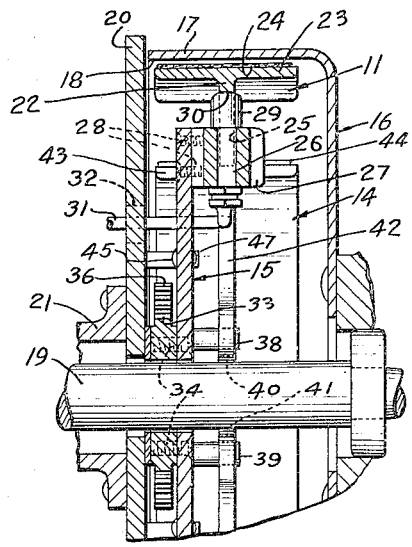
Fig. 3.
Fig. 2.
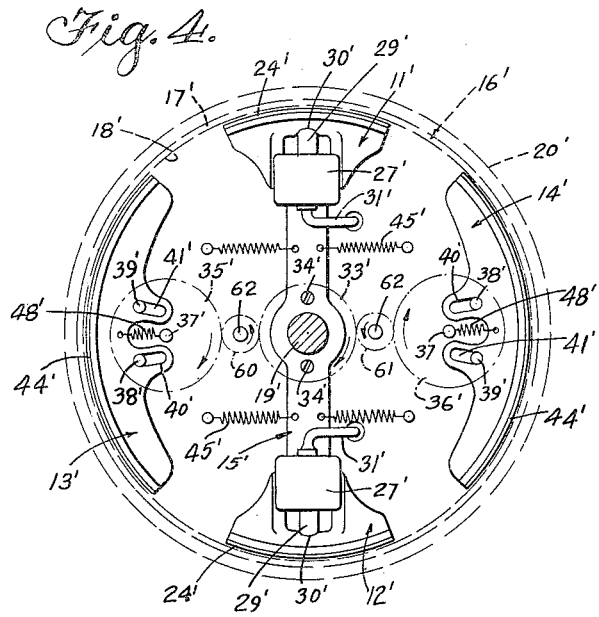
Fig. 4.
INVENTOR.
Robert H. Merritt.
BY Donald L. Ryu

United States Patent Office 2,734,599
Patented Feb. 14, 1956

2,734,599

TORQUE ENGAGED BRAKE

Robert H. Merritt, Los Angeles, Calif.

Application October 20, 1952, Serial No. 315,679

10 Claims. (Cl. 188—141)

This invention relates to a braking mechanism and more specifically to a mechanical mechanism for actuating the shoes of a brake. More specifically, the invention relates to a brake shoe actuating mechanism wherein the rotary torque of a brake drum is transmitted thru a pair of actuating shoes to deliver this torque for use in applying force to a pair of braking shoes.

The invention has particular utility in connection with braking mechanisms for use with vehicles and the like, however it is to be understood that the device may also be employed with clutches and other frictional engagement mechanisms.

It is an object of the invention to provide a novel brake actuating mechanism utilizing the torque of a brake drum as an actuating force for suitable braking shoes.

Another object of the invention is to provide a novel brake actuating mechanism.

A further object of the invention is to provide a novel means for transmitting brake actuating force from a brake drum to a pair of braking shoes.

A still further object of the invention is to provide a novel braking mechanism of the class described that is relatively simple in construction, economical in manufacture, efficient in use at all speeds and reliable in operation.

Other and further important objects and advantages of the present invention will become apparent from the disclosures in the following description, appended claims and accompanying drawings wherein:

Fig. 1 is an elevation view, partially in section, showing the brake actuating mechanism of the present invention;

Fig. 2 is a fragmentary transverse sectional view taken substantially as indicated as line 2—2, Fig. 1;

Fig. 3 is another fragmentary sectional view showing the braking shoe of the present mechanism and taken substantially as indicated by line 3—3, Fig. 1; and Fig. 4 is a schematic view similar to the mechanism shown in Fig. 1 and showing a modified form of brake actuating mechanism.

Referring to the drawing by reference characters the present brake actuating mechanism is shown as indicated generally at 10. The mechanism includes generally a pair of actuating shoes, 11 and 12, a pair of braking shoes, 13 and 14 and an actuating member, 15.

The braking and actuating shoes of the present mechanism are adapted for use with a suitable brake drum, 16 having an axial portion, 17 and a brake shoe engaging surface, 18. The shoe 16 is mounted on a suitable shaft 19. A back plate 20 is secured against rotation to suitable framed members 21 and position adjacent the end of the portion 17 of the brake drum.

Each of the actuating shoes 11 and 12 is substantially T-shaped in cross section having a centrally disposed rib 22 and outstanding flanges 23 which are adapted to support suitable low coefficient brake lining 24. Each of the actuating shoes is further provided with radially inwardly extending guide ways 25, these ways being slightly received in grooves 26 in the sides of a suitable pair of actuating hydraulic cylinders 27. The cylinders 27 are secured to the actuating member 15 by means of screws 28 for example. The actuating shoes 11 and 12 are thus radially movable relative to the actuating member 15 but held against circumferential movement relative to each other. Each of the hydraulic cylinders 27 have pistons 29 which are adapted to engage the ribs 22 as at 30 to cause outward movement of the actuating shoes, hydraulic pressure being delivered to the cylinders 27 through suitable conduits 31 which lead to the cylinders through openings 32 in the back plate 20.

The central axial portion of the actuating member 15 is adapted to be rotatably twirled on the shaft 19 and supports a spur gear 33 by suitable screws 34. The gear 33 is adapted for engagement with a pair of cooperating spur gears 35 and 36 which are pivotally mounted on shafts 37, the shafts 37 being secured to the back plate 20.

The gears 36 and 37 are adapted to support a pair of spaced, radially extending pins 38 and 39, which are adapted to be received in slots 40 and 41 in ribs 42 formed on each of the braking shoes 13 and 14. The braking shoes further include flanges 43 which are adapted to support suitable low coefficient of friction lining 44.

As shown in Fig. 1, the actuating shoes 11 and 12 and the braking shoes 13 and 14 are circumferentially spaced about the interior surface 18 of the drum 16 the lining 24 and the lining 44 being adapted to engage this surface upon actuation of the shoes. The actuating shoes 11 and 12 occupy approximately $\frac{1}{12}$ of the inner circumference of the drum 16, and the braking shoes 13 and 14 occupy approximately $\frac{1}{4}$ of like surface.

A plurality of tension spring 45 are connected to each lateral side of the actuating member 15 through suitable openings 46, the outer ends of these springs being secured to pins 47, the pins 47 being mounted on the back plate 20. This spring arrangement insures that the actuating member 15 will return to its neutral position as shown in Fig. 1 upon relaxation of the actuating shoes 11 and 12. Also in Fig. 1, there is shown a pair of tension springs 48 which have one end secured to the gear pivots 37 and the other end secured in openings 49 in the ribs 42 of the braking shoes. This latter spring means insures return of the actuating shoes 13 and 14 to their neutral positions with the actuating pins 38 and 39 in the outer radial ends of the slots 40 and 41 in each of the braking shoes.

In operation, and assuming clock-wise rotation of the drum 16 as seen in Fig. 1, upon delivery of fluid pressure to the cylinders 27, the actuating shoes 11 and 12 will be moved radially outwardly until the lining 24 of the actuating shoes engages the surface 18 of the drum Upon engagement with this surface the actuating shoes will be rotated slightly with the drum in a clock-wise direction and, through the attachment with the actuating member 15, will also rotate the gear 33 in a clock-wise direction. The rotation of the gear 33 will cause counter-clock-wise of the gears 35 and 36 so as to force the actuating pins 39 into the radial outward end of the slots 41 thus moving the braking shoes into contact with the surface 18 of the drum. It is to be noted that initial contact of the lining 44 of the braking shoes will be at a clock-wise end of this lining, and that upon continued pressure of the pins 39 in the ends of the slots 41 will force the entire length of the lining 44 into contact with the surface 18.

When operating the drum 16 in a clock-wise direction the pins 38 take no part in the operation of the mechanism however upon counterclockwise rotation of the drum 16 the pins 38 will transmit force to the shoes 13 and 14 while the pins 39 will take no part in the action.

In Fig. 4 a modification of the invention is schematically shown and like parts are indicated by single primed reference numerals. In this modification a pair of idler gears 60 and 61 are rotatably mounted on shafts 62 which are secured to the back plate 20', the gears 60 and 61 being interposed between the gear 33' and the gears 35' and 36'. This arrangement permits actuation of the braking shoes 13' and 14' in the same direction of rotation as that of the actuating shoes 11' and 12'. Such an arrangement has been found necessary when the braking mechanism is applied to types of machinery and/or vehicles requiring more precision operation of the braking mechanism.

Having thus described the invention and the present modifications and arrangements thereof, it is desired to emphasize and expressly point out the fact that many modifications may be resorted to in a manner limited only by a just interpretation of the following claims.

I claim:

1. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; toothed gear means associated with said actuating member for moving said braking shoes into contact with said drum upon engagement with said drum and slight circumferential rotation of said actuating shoes; and means to move said actuating shoes into contact with said drum.

2. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; a gear train associated with said actuating member for moving said braking shoes into contact with said drum upon engagement with said drum and slight circumferential rotation of said actuating shoes; and hydraulic cylinder actuating means to move said actuating shoes into contact with said drum.

3. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; a gear train associated with said actuating member for moving said braking shoes into contact with said drum upon engagement with said drum and slight circumferential rotation of said actuating shoes; spring means normally urging said actuating and braking shoes into a retractive position from said drum; and means to move said actuating shoes into contact with said drum.

4. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; a gear train associated with said actuating member for moving said braking shoes into contact with said drum upon engagement with said drum and slight circumferential rotation of said actuating shoes; spring means normally urging said actuating and braking shoes into a retracted position from said drum; means to limit the retraction of said shoes by said spring means; and means to move said actuating shoes into contact with said drum.

5. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; a gear train associated with said actuating member for moving said braking shoes into contact with said drum upon engagement with said drum and slight circumferential rotation of said actuating shoes; spring means normally urging said actuating and braking shoes into a retracted position from said drum; and hydraulic cylinder actuating means to move said actuating shoes into contact with said drum.

6. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; toothed gear means associated with said actuating member for moving said braking shoes into contact with said drum upon engagement with said drum and slight circumferential rotation of said actuating shoes; and means carried by said actuating member to move said actuating shoes into contact with said drum.

7. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; axial pivot means for said actuating member; primary gear means carried by said actuating member; secondary gear means rotatably mounted on said backing plate and adapted for engagement with said primary gear means; means carried by said secondary gear means for engaging said braking shoes to cause outward movement of said braking shoes into contact with said drum upon engagement with said drum and slight circumferential movement of said actuating shoes; and means to move said actuating shoes into contact with said drum.

8. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; axial pivot means for said actuating member; primary gear means carried by said actuating member; secondary gear means rotatable mounted on said backing plate and adapted for engagement with said primary gear means; means carried by said secondary gear means for engaging said braking shoes to cause outward movement of said braking shoes into contact with said drum upon engagement with said drum and slight circumferential rotation of said actuating shoes; and hydraulic cylinder actuating means to move said actuating shoes into contact with said drum.

9. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; axial pivot means for said actuating shoes; primary gear means carried by said actuating member; secondary gear means rotatably mounted on said backing plate and adapted for engagement with said primary gear means; means carried by said secondary gear means for engaging said braking shoes to cause outward movement of said braking shoes into contact with said drum upon engagement with said drum and slight circumferential rotation of said actuating shoes; and hydraulic cylinder actuating means carried by said actuating member to move said actuating shoes into contact with said drum.

10. A braking mechanism comprising, in combination: a rotatable brake drum; a backing plate fixed against rotation; a pair of actuating shoes positioned for engagement with the interior surface of said drum; a pair of braking shoes positioned circumferentially intermediate said actuating shoes; an actuating member connecting said actuating shoes, said actuating shoes being radially movable thereon; axial pivot means for said actuating member; primary gear means carried by said actuating member; secondary gear means rotatably mounted on said backing plate and adapted for engagement with said primary gear means; means carried by said secondary gear means for engaging said braking shoes to cause outward movement of said braking shoes into contact with said drum upon engagement with said drum and slight circumferential rotation of said actuating shoes; spring means normally urging said actuating and braking shoes into a retracted position from said drum; means to limit the retraction of said shoes by such spring means; and hydraulic cylinder actuating means carried by said actuating member to move said actuating shoes into contact with said drum.

References Cited in the file of this patent

UNITED STATES PATENTS

| 1,758,139 | Blackmore | May 13, 1930 |
| 2,120,917 | Hause | June 14, 1938 |
| 2,347,388 | Ayers | Apr. 25, 1944 |

FOREIGN PATENTS

| 209,250 | Great Britain | Jan. 10, 1924 |